Dec. 5, 1961 C. R. SHIPLEY, JR 3,011,920
METHOD OF ELECTROLESS DEPOSITION ON A SUBSTRATE AND CATALYST SOLUTION THEREFOR
Filed June 8, 1959
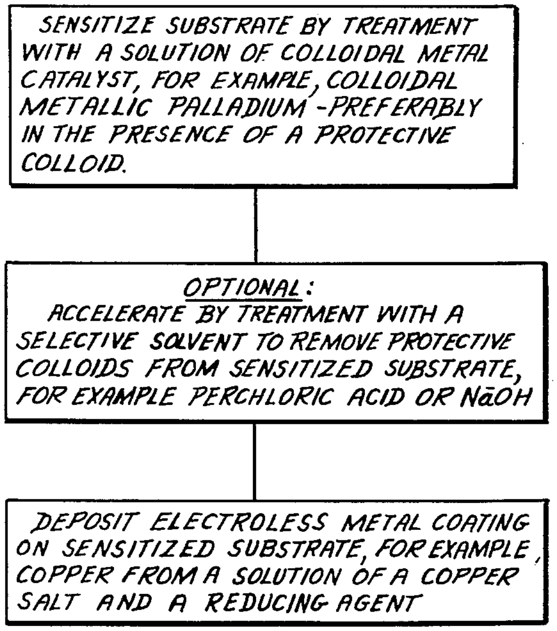
INVENTOR.
*Charles R. Shipley, Jr.*
BY
*Roberts, Cushman & Grover*
ATT'YS United States Patent Office 3,011,920

Patented Dec. 5, 1961

3,011,920

METHOD OF ELECTROLESS DEPOSITION ON A SUBSTRATE AND CATALYST SOLUTION THEREFOR

Charles R. Shipley, Jr., Newton, Mass., assignor to Shipley Company, Inc., Wellesley, Mass., a corporation of Massachusetts Filed June 8, 1959, Ser. No. 818,554
21 Claims. (Cl. 117—213)

This invention relates to electroless metal deposition and more particularly to the provision of metal deposit coatings in the manufacture of printed electrical circuits, as linings for wave guide cavities, as an initial coating in electroforming, and for decoration. Electroless metal deposition refers to the chemical deposition of an adherent metal coating on a conductive, non-conductive, or semi-conductive substrate in the absence of an external electric source.

In the manufacture of printed circuits, the preferred method utilizes an electroless metal deposit on a dielectric substrate either as a uniform surface coating or in a predetermined pattern. This initial electroless deposit is usually thin and is further built up by electroplating. The substrate is most often a plastic panel which may have a metal foil such as copper laminated to one or both of its surfaces, for example with adhesives, to form a metal clad substrate. Where both surfaces of the substrate are to be used, connections are provided therebetween by means of holes through the panel at appropriate locations, the walls of these through-holes being made conductive with an electroless coating.

The usual prior art method of providing the electroless metal coating on non-conductive or semi-conductive substrates comprises cleaning of the substrate surface; treating the surface by immersion in a bath containing stannous chloride or other stannous salt; seeding or catalyzing to provide catalytic nucleating centers by immersion in a salt of a metal catalytic to the deposition of the desired metal coating such as silver nitrate or the chlorides of gold, palladium, or platinum, these metal ions being reduced to catalytic metal nucleating centers by the stannous ions adsorbed on the substrate and/or by reducing agents contained in the electroless metal deposition bath; and thereafter depositing the desired metal, such as copper, nickel, or cobalt by treating the catalyzed surface with a salt of the desired metal plus a reducing agent therefor.

A serious objection to this prior method has been that metal was deposited on the metal surface of clad-laminates simultaneously with the coating of through-hole walls with a bond so inadequate that the coating over the metal had to be removed by sanding or buffing. This sanding or buffing increased the expense and frequently resulted in ruining the laminate. Furthermore, this poor bond caused trouble at the boundary between the through-hole wall electroless coating and the edges of the metal cladding at the hole edges. If the electroless coating to the edge of the metal foil was not removed, a poor connection often resulted while removal of the electroless coating from the foil edge by machining increased the expense and sometimes ruined the laminate.

The above and other prior methods for providing electroless metal coating deposits possess additional limitations and disadvantages, most especially with regard to the deposition of copper which is preferred for printed circuit use and which has been the most difficult to accomplish. These methods involve a relatively large number of steps which increases the expense. The above catalysis is dependent on the wetting of the substrate surface by the precoating catalytic solutions and even with great care, it is difficult to get uniform results.

The prior sensitizing and seeding baths are generally unstable, requiring frequent replacement or replenishment and providing inconsistent results due to their tendency to lose effectiveness without warning. Also, the adhesion of the deposited metal coating to dielectric surfaces has often been inadequate, especially to smooth surfaces.

It is accordingly the principal object of this invention to provide improved methods and materials for depositing electroless metal coatings. Further objects include the provision of a metal coating method which does not depend upon the wetting of the substrate surfaces, which is simpler and less expensive, which is more reliable, which requires fewer steps than methods heretofore employed, which will provide a coating to a wide variety of both conductive and non-conductive materials, and which provides a deposited metal coating to metal with a bond so strong that it need not thereafter be removed. A still further object includes the provision of catalytic baths which are relatively stable and which provide consistent results over an extended period of time.

According to this invention, these objects are achieved by the method of deposition on a clean substrate which comprises catalyzing the substrate by treatment with a bath containing colloidal particles of a catalytic metal and thereafter plating the substrate by treatment with a known deposition solution. The deposition solution usually comprises a salt of nickel, cobalt, copper, silver, gold, chromium, or members of the platinum family and a reducing agent therefor, and the catalytic metal is a metal known to catalyze the desired deposition. For stability, it is preferred that the colloidal solution also contain a protective colloid, and/or a deflocculating agent. Where these latter material are employed, the above process can be accelerated by an intermediate treatment in a bath comprising a solvent for the deflocculating agent or the protective colloid or both, the bath being a non-solvent for the catalytic metal colloid.

It has been heretofore known that particles of many metals catalyze or promote the electroless chemical reduction deposition of the desired metal on a clean substrate. For example, the following metals are reported to be catalytic to the deposition of nickel and cobalt: copper, beryllium, aluminum, carbon, tungsten, tellurium, cobalt, platinum, silver, boron, thallium, vanadium, titanium, nickel, gold, germanium, silicon, molybdenum, selenium, iron, tin and palladium, with the precious metals gold, palladium, and platinum being preferred. The same metals are catalytic to the deposition of copper, especially copper, lead, platinum, rhodium, ruthenium, osmium, iridium, iron, cobalt, carbon, silver, nickel, aluminum, gold, palladium, and magnesium, with gold, platinum, and palladium being preferred. Cobalt, nickel, and particularly iron have been used to catalyze the deposition of chromium.

It has now been discovered that a substantially superior process results from the preparation of colloidal solutions of a desired catalytic metal, treating the cleaned substrate by immersion or spraying with the colloidal solution, followed by the subsequent introduction into the appropriate plating bath. These colloidal solutions can be made by methods heretofore known or by the improved methods to be hereinafter described.

This invention may be better understood by reference to the following examples:

*Example 1*

| | | |
|---|---|---|
| $PdCl_2$ | g | 1 |
| Water | ml | 600 |
| HCl (conc.) | ml | 300 |
| $SnCl_2$ | g | 50 |

The above ingredients can be added in the order listed or the addition of the stannous chloride and palladium chloride can be reversed. Colloidal palladium is formed by the reduction of the palladium ions by the stannous chloride. Simultaneously, stannic acid colloids are formed, together with adsorbed stannic oxychloride and stannic chloride. The stannic acid colloids comprise protective colloids for the palladium colloids while the oxychloride constitutes a deflocculating agent further promoting the stability of the resulting colloidal solution. The relative amounts of the above ingredients can be varied provided the pH is below about 1 and provided an excess of stannous ions is maintained. The solution can also be made more concentrated or can be further diluted, preferably with additional hydrochloric acid of sufficient strength to maintain the pH below about 1. It should be noted that this method does not require coagulation, washing, or dialysis of the metal colloids, as heretofore customary in preparing stannic acid colloids.

*Example 2*

| | | |
|---|---|---|
| $PdCl_2$ | g | 1 |
| Water | ml | 600 |
| HCl (conc.) | ml | 300 |
| Sodium stannate ($Na_2SnO_3 \cdot 3H_2O$) | g | 1½ |
| $SnCl_2$ | g | 37½ |

Both Examples 1 and 2 above illustrate new compositions of matter as well as new methods of preparation. Neither example requires dialysis as heretofore conventional for the preparation of stable metal colloid solutions and as required in Example 5 below. Sufficient stannous ions are added in both examples to reduce all of the palladium as required for good catalysis on a metal surface and to provide an excess of this ion in the bath. In Example 2, the addition of alkali stannate provides stannic acid colloids in the acid bath prior to the reduction of the palladium and consequently provides an easier and less critical mixing procedure. The solutions resulting from either of Examples 1 and 2 are stable for many months or longer and can be maintained during use or exposure to air by periodic addition of a stannous salt sufficient to maintain an excess of stannous ions at all times. The concentrations of Example 2 can also be varied as stated for Example 1.

Similar catalytic colloidal solutions can be prepared from other metal salts, Examples 3 and 4 below for gold and platinum being typical.

*Example 3*

| | | |
|---|---|---|
| $SnCl_2$ | g | 37½ |
| Water | ml | 600 |
| HCl (conc.) | ml | 300 |
| Sodium stannate (optional) | g | 1½ |
| $HAuCl_4 \cdot H_2O$ | g | 1 |

*Example 4*

| | | |
|---|---|---|
| $H_2PtCl_6$ | g | 1 |
| Water | ml | 600 |
| HCl (conc.) | ml | 300 |
| Sodium stannate (optional) | g | 1½ |
| $SnCl_2$ | g | 37½ |

Examples 1 to 4 above illustrate new methods for preparing novel catalytic colloidal solutions which are both more stable and easier to make than similar colloidal solutions heretofore known. The palladium catalysts illustrated in Examples 1 and 2 are preferred. These catalytic solutions are particularly stable because of the use of excess acid and stannous ion and because they use protective colloids, preferably lyophilic sols, to impart stability to lyophobic metal sols which can otherwise be readily precipitated by small amounts of impurities.

Catalytic metal colloidal solutions can also be prepared in alkaline solution as illustrated below. Such solutions make possible the use of a completely alkaline solution where the deposition solution used is also alkaline. Example 5 is characterized by the use of stannic acid protective colloids peptized by alkali.

*Example 5*

| | | |
|---|---|---|
| $PdCl_2$ | g | 1 |
| HCl (conc.) sufficient to dissolve the $PdCl_2$. | | |
| Water | ml | 200 |
| Sodium stannate (optional) | g | 1½ |
| $SnCl_2$ | g | 5 |

The resulting mixture is dialyzed to remove chlorides and other impurities and the colloid precipitate peptized by a dilute sodium hydroxide or ammonium hydroxide solution.

The following example illustrates the use of other protective colloids.

*Example 6*

| | | |
|---|---|---|
| $PdCl_2$ | g | 1 |
| NaCl | g | 1 |
| Water | ml | 900 |
| Tannic acid | g | 1 |

Add 10% NaOH solution until a definite color change occurs. If reduction of the palladium by the tannic acid is incomplete, complete by adding a small amount of hydrazine hydrate, formaldehyde, or an ethereal solution of red phosphorous. Similar colloidal solutions can be obtained by using other colloidal material in place of the tannic acid, such as gelatin or albumin. With these latter materials, reduction is accomplished by one of the additional reducing agents stated above.

While the alkaline catalysts shown in Examples 5 and 6 are useful, they are not as good as the acid catalysts illustrated in Examples 1 to 4. Example 6 is also not so stable but does not require the acceleration step to be hereinafter described, since the protective colloids of that example are readily soluble in water.

As illustrated by the foregoing examples which are substantially free of water-impermeable resinous constituents, the catalytic colloid solutions of this invention are, in distinction to paints, substantially incapable of forming a continuous water-impervious film on the substrate.

As evidence of the better adsorption of colloidal catalytic particles over former methods, it has been found that a dip into dilute hydrochloric acid removes the catalytic coatings provided by the prior art two-step treatment described, whereas the colloidal catalytic treatment herein disclosed provides surface particles which remain on the substrate surface when so immersed for a considerable period of time. This stronger adsorption is believed to provide, in part at least, the stronger bond obtained.

The colloidal catalytic solutions can be used to deposit metal from deposition solutions heretofore known. A colloid should, of course, be selected which is catalytic to a desired metal deposition. Examples of known metal deposition solutions for copper, nickel, and cobalt are given below.

*Example 7*

| | G. |
|---|---|
| A. Rochelle salts | 170 |
| NaOH | 50 |
| $CuSO_4 \cdot 5H_2O$ | 35 |
| Water to make 1 liter. | |
| B. Formaldehyde (37% by wt.). | |

Mix 5 to 8 parts A per part B by volume immediately prior to use.

*Example 8*

| | Ounces |
|---|---|
| $NiCl_2 \cdot 6H_2O$ | 4 |
| $NaH_2PO_2 \cdot H_2O$ | 1.3 |
| Sodium citrate | 1.3 |
| Water to make 1 gal. | |

Operate at 194° F. and pH 4 to 6.

*Example 9*

| | |
|---|---|
| $CoCl_2 \cdot 6H_2O$ | 4 |
| $NaH_2PO_2 \cdot H_2O$ | 1.3 |
| Sodium citrate | 1.3 |
| Water to make 1 gal. | |

Operate at 194° F. and pH 9 to 10. Adjust pH with $NH_4OH$.

*Example 10*

| | G. |
|---|---|
| $NiCl_2 \cdot 6H_2O$ | 30 |
| $NaH_2PO_2 \cdot H_2O$ | 10 |
| $NH_4Cl$ | 50 |
| Trisodium citrate·5½$H_2O$ | 100 |
| Water to make 1 liter. | |

Operate at 194° F. and pH 8 to 10. Adjust pH with ammonium hydroxide.

*Example 11*

| | |
|---|---|
| $CoCl_2 \cdot 6H_2O$ | 30 |
| $NaH_2PO_2 \cdot H_2O$ | 20 |
| Rochelle salts ($NaKC_4H_4O_6 \cdot 4H_2O$) | 200 |
| $NH_4Cl$ | 50 |
| Water to make 1 liter. | |

Operate at 194° F. and pH 9 to 10. Adjust pH with ammonium hydroxide.

It should be noted that in Examples 1 to 5 above the colloidal solutions all contain a protective colloid and deflocculating agent. Where the colloidal solutions contain these additional stabilizing substances, the process of deposition based thereon can be accelerated by intermediate treatment of the substrate, after catalysis and before deposition, with a solvent which will remove the protective colloid and/or the deflocculating agent from the colloidal particles of catalytic metal on the substrate surface. Two examples of such solvents are dilute acids such as perchloric acid (e.g. 10%), sulfuric acid (e.g. 5%), or phosphoric acid (e.g. 10%) and alkaline materials such as NaOH (e.g. 5%), sodium carbonate (e.g. 5%) or sodium pyrophosphate (e.g. 5%) in water. None of these materials affect the catalytic metal colloids on the substrate surface. The alkaline accelerators are preferred for acid colloid solutions, except where they cause oxidation of the treated surface, and acids are preferred for basic catalysts.

While in the interest of speed and economy it is desirable to accelerate the process, such acceleration is not required when the deposition solution will itself remove the above stabilizing material from the treated substrate. Thus for example an alkaline copper deposition solution such as Example 7 will deposit copper without intermediate treatment but not as rapidly. The above accelerators are much faster and serve as good storage baths which will maintain the catalyzed substrate for an extended period of time. In addition to accelerating the deposition process, the accelerating step deters the formation of blisters in a deposited metal coating on a smooth dielectric surface. This latter characteristic is extremely useful in electroforming, decorative metallizing, and in metallizing smooth plastic tubes used in making wave guide cavities.

In practicing the present invention, the substrate to be coated should be thoroughly cleaned. Generally, conventional cleaning methods are satisfactory. Such cleaning can include mechanical cleaning, scrubbing, organic solvents, alkaline or acid cleaners, wetting agents, and pickling baths, with suitable rinsing between steps.

As a specific example of a complete processing procedure according to this invention, the following example is given for a copper-clad plastic laminate substrate provided with through-holes at desired locations:

*Example 12*

(1) Precleaning the copper substrate:

(*a*) Clean the substrate by immersion in a hot alkaline cleaner, and rinse in clean water, (*b*) Pickle in an acid bath with an etchant for copper, for example a cupric chloride-hydrochloric acid bath, and rinse, (*c*) Dip in 10% by volume HCl to remove residues, and rinse.

(2) Catalysis: Immerse the cleaned substrate for 30 seconds or more in the colloidal solution according to Example 1 which catalyzes both the copper surfaces and the plastic surface exposed in the through-hole walls. Rinse.

(3) Acceleration (optional): Immerse in an acidic accelerating solution, for example a 10% perchloric acid solution, for one minute or more, and rinse.

(4) Metal deposition: Immerse the catalyzed substrate in the desired metal deposition solution, for example the copper bath of Example 7, for a sufficient time to build up the desired thickness of metallic coating. Rinse thoroughly and dry.

(5) Electroplating: Immerse the coated substrate in a 10% solution of hydrochloric acid to assure a clean copper coating, rinse, and electroplate copper over the electroless coating until desired thickness is obtained.

With this process strong uniform coatings of conductive metal are provided on the substrate on both the plastic surface exposed in the through-holes and to the metal surfaces without the necessity of removing the metal coating from the cladding prior to electroplating. This is particularly desirable in the case of the preferred copper coating wherein it has not been heretofore possible to make a strongly bonded electroplated copper coating to the cladding without first removing the intermediate electroless deposit.

From the foregoing description it will be noted that this invention provides a simpler and less expensive electroless metal deposit which is superior to the coatings heretofore obtained. The present colloidal catalysts are not dependent upon the wetting of a substrate surface and accordingly do not require the use of wetting agents while providing more uniform and reliable results. It is believed that the Brownian movement which occurs in all colloidal solutions supplies the energy causing the colloidal particles to be firmly and uniformly adsorbed in the substrate surface. Since only a small amount of this catalyst will be adsorbed, the catalytic colloid solutions disclosed have a long and stable useful life. The single catalytic treatment permits the electroless deposition of copper over copper with an excellent bond. This bond is so strong that in one instance, a one inch wide strip of electroplated copper over an electroless copper deposit to a copper-clad surface supported over forty pounds direct pull at 90°.

As a further advantage of the process herein described, the catalyzed substrate can be stored for several hours in the accelerator bath prior to electroless deposition without detriment to the final product.

For deposition to an unclad, non-metallic surface, the following procedure can be employed.

*Example 13*

(1) Catalysis: Immerse the substrate for 30 seconds or longer in the colloidal solution of Example 2 above, and rinse.

(2) Acceleration (optional): Immerse the catalyzed substrate in an alkaline accelerator, for example 5% NaOH for one minute or more, and rinse.

(3) Metal deposition: Immerse the catalyzed substrate in the desired metal deposition solution, for example the copper bath of Example 7, for a sufficient time to build up the desired thickness of metallic coating. Rinse thoroughly and dry.

With this process, good practice requires a relatively clean substrate although the cleaning is not so critical as with prior processes, and can be eliminated in some cases. It is not necessary that the substrate be capable of being wetted with water either before or after catalysis.

The accompanying drawing is an illustrative flow chart of the present process.

It should be understood that the foregoing description is for the purpose of illustration only and that the invention includes all modifications falling within the scope of the appended claims.

I claim:

1. The method of electroless metal deposition on a substrate which comprises treating the substrate, prior to electroless deposition of a desired metal thereon, with a colloidal metal solution of a metal catalytic to the deposition of said electroless metal, the metal colloid particles being dispersed in a liquid medium incapable of forming a water-impervious film on said substrate.

2. The method according to claim 1, wherein said metal colloids are dispersed in water.

3. The method according to claim 1 wherein said metal colloids are prepared by reducing a dissolved salt of said metal.

4. The method according to claim 1 wherein said colloidal metal solution contains a protective colloid for said metal colloids, said protective colloid being selectively removable from the substrate to expose the metal colloids thereon.

5. The method according to claim 4 wherein said method is accelerated by treating the substrate, after treatment with metal colloids, with a solvent for said protective colloid, said solvent being a non-solvent for the catalytic metal colloids.

6. The method of depositing an adherent metal coating on a substrate which comprises treating the substrate with a colloidal solution of metal colloids dispersed in a liquid medium incapable of forming a water-impervious film on the substrate, said colloids being formed by reducing dissolved ions of said metal, said colloidal solution containing a protective colloid for said metal colloids, removing protective colloid from the substrate to expose the metal colloids thereon, and electrolessly depositing the desired metal coating on the treated substrate, said colloidal metal being a metal catalytic to the deposition of the desired electroless coating metal.

7. The method according to claim 6 wherein said desired deposition metal is selected from the group consisting of copper, nickel, cobalt, silver, gold, chromium, a member of the platinum family, and mixtures thereof, and said metal colloid is selected from the group consisting of silver, gold, the platinum family metals, and mixtures thereof.

8. The method according to claim 7 wherein said protective colloid is stannic acid.

9. The method according to claim 7 wherein said metal colloids are dispersed in water.

10. The method according to claim 7 wherein said protective colloid is selectively removed from the substrate by treatment with a solvent therefor, said solvent being a non-solvent for said metal colloids.

11. The method according to claim 10 wherein said solvent is selected from the group consisting of aqueous acid and aqueous alkali.

12. The method according to claim 10 wherein said protective colloid is removed from the substrate by the metal bath used for electroless deposition, said bath being a selective solvent for said protective colloid.

13. The method of electroless metal deposition on a substrate which comprises catalyzing said substrate by treatment with a solution containing colloidal particles of a catalytic metal, said solution being substantially free of water-impermeable resinous constituent, and depositing a metal coating on said catalyzed substrate by subsequent treatment with a deposition solution comprising a salt of the metal to be deposited and a reducing agent therefor.

14. The method of electroless copper deposition on a substrate which comprises catalyzing said substrate by treatment with a non-resinous solution containing a colloidal metal selected from the group consisting of silver, gold, and the platinum family metals protected by colloids of stannic acid, and depositing copper on said catalyzed substrate by subsequent treatment with a solution of a copper salt, and a reducing agent therefor.

15. A colloidal catalyst solution for catalyzing a clean substrate prior to electroless metal deposition thereon, said catalyst comprising the solution resulting from admixture of an acid soluble salt of a catalytic metal selected from the group consisting of silver, gold, and the platinum family metals, a hydro-halide acid, and a stannous salt soluble in aqueous solution, said stannous salt being in excess of the amount necessary to reduce said metal salt to colloidal metal, said solution having a pH less than about 1.

16. A colloidal catalyst solution according to claim 15 also containing an alkali stannate salt.

17. The method of maintaining the colloidal catalyst solution according to claim 15 which comprises adding additional stannous halide salt soluble in aqueous solution thereto during use sufficient to maintain free stannous ions at all times.

18. A colloidal catalyst solution for catalyzing a clean substrate prior to electroless metal deposition, said catalyst comprising the solution resulting from the admixture of palladium chloride, hydrochloric acid, and stannous chloride in water, said stannous chloride being in excess of the amount necessary to reduce said palladium, said solution having a pH less than about 1.

19. The method of preparing colloidal catalysts for electroless deposition which comprises dissolving a halide salt of a metal selected from the group consisting of silver, gold and the platinum family metals in hydrochloric acid, and adding stannous halide in excess of the amount necessary to reduce the said halide to colloidal metal, the solution having a pH less than about 1.

20. The method according to claim 19 wherein an alkali stannate is added prior to the addition of said stannous halide.

21. The method of preparing a colloidal catalyst for electroless deposition which comprises dissolving palladium chloride in hydrochloric acid, adding sodium stannate, and adding stannous chloride in excess of the amount necessary to reduce said metal halide to colloidal metal, said solution having a pH less than about 1.

References Cited in the file of this patent

UNITED STATES PATENTS

| | | |
|---|---|---|
| 2,454,610 | Narcus | Nov. 23, 1948 |
| 2,872,359 | Saubestre | Feb. 3, 1959 |

FOREIGN PATENTS

| | | |
|---|---|---|
| 806,977 | Great Britain | Jan. 7, 1959 |

OTHER REFERENCES

Wein: Reprint from "Glass Industry," July 1954, 6 pages.